United States Patent [19]

Kor et al.

[11] Patent Number: 5,046,665
[45] Date of Patent: Sep. 10, 1991

[54] CONTROL MEANS FOR INJECTION SYSTEMS OF AGRICULTURAL SPRAYERS

[75] Inventors: Bouko J. Kor; William Porter, both of Winnipeg, Canada

[73] Assignee: Westeel, A Division of Jannock Steel Fabricating Company, Winnipeg, Canada

[21] Appl. No.: 511,339

[22] Filed: Apr. 19, 1990

[51] Int. Cl.⁵ ............................................. B67D 5/08
[52] U.S. Cl. ...................................... 239/71; 235/375
[58] Field of Search ........................... 239/71, 61, 172; 194/212; 235/460, 375

[56] References Cited

U.S. PATENT DOCUMENTS

| | | |
|---|---|---|
| 2,694,154 | 8/1954 | Kingsbury . |
| 3,163,758 | 3/1961 | Treacy . |
| 3,476,918 | 11/1969 | Howell ................................ 235/460 |
| 3,586,863 | 6/1971 | Laks . |
| 3,695,314 | 10/1972 | Watts et al. . |
| 3,917,045 | 11/1975 | Williams et al. . |
| 3,943,337 | 3/1976 | Yamashita et al. ................. 235/460 |
| 4,128,757 | 12/1978 | Garner, Jr. ......................... 235/460 |
| 4,196,852 | 4/1980 | Thomas, III . |
| 4,467,961 | 8/1984 | Coffee et al. ........................ 239/71 |
| 4,553,702 | 11/1985 | Coffee et al. . |
| 4,629,164 | 12/1986 | Sommerville ....................... 239/71 |
| 4,650,124 | 3/1987 | Connaughty et al. . |

Primary Examiner—Andres Kashnikow
Assistant Examiner—L. Morris
Attorney, Agent, or Firm—Murray E. Thrift; Stanley G. Ade; Adrian D. Battison

[57] ABSTRACT

A liquid chemical proportion and application rate controller for agricultural injection type sprayers is connected to a microprocessor and to one or more pumps. Depending upon the chemical being used, a control key is inserted into a monitor which controls the output of the microprocessor to the pump or pumps and automatically controls the rate of application, the dilution proportions, indicates and adapts the output for Metric, Imperial instructions or in combination of both (i.e. liters per acre). Such a key may be provided with the container of chemical and discarded when the spraying is completed.

12 Claims, 3 Drawing Sheets

CONTROL MEANS FOR INJECTION SYSTEMS OF AGRICULTURAL SPRAYERS

BACKGROUND OF THE INVENTION

This invention relates to new and useful improvements in agricultural injection sprayers and particularly to a method of setting the desired rate of chemical application to suit the chemical being utilized.

Conventionally, the operator of an injection system adjusts the rate of chemical application in one of two ways:

(1) By using charts and/or graphs, the corresponding indices of the machine are ascertained, i.e. where a flow meter ball should be located, etc. and then the machine is set to these indices;

(2) By inputting the rate directly into a monitor in the cab by either a thumb wheel system where the numbers are manually rolled into their proper position, or electrically by pushing buttons until the rate on the display equals the desired rate.

The first method is, of course, lengthy, cumbersome and prone to misorientation and error.

The second system is an improvement and gives the appearance initially of being the optimum solution to assuring the proper rate of chemical application. However, several factors enter into the second system indicating that this system is not as advantageous as initially believed.

Firstly, the units of measurement vary to such a degree that there exists three systems in use today in Western Canada, namely Metric, Imperial and "bastard" (liters/acre).

Secondly, conversion may be required if the monitor demands Imperial measure and only Metric information is found on the container or, if the monitor can accept all three systems, the switch may be on "Metric" when the operator believes it is on "Imperial". It will therefore be appreciated that conversion of any kind by the operator is prone to error.

Thirdly, the operator may read the rate from the chemical container, but as it is rarely possible to take the container with him inside the cab, memory is relied upon to input the proper numbers and this is awkward and difficult to check.

Fourthly, to input information into a monitor correctly usually requires a certain procedure to prevent inadvertent input or change of the input information. Errors may occur including incorrect registration of numbers or information placed in the wrong location. If programming is direct as with the thumbwheel system, the rate of application may be changed inadvertently during operation, again relying on memory to signal that the input information is now correct.

A third system type is described in Coffee et al U.S. Pat. No. 4,553,702 where, in an injection sprayer, the chemicals to be sprayed are supplied in special containers equipped with pre-coded electronic memory chips that are interrogated by a microprocessor controlled sprayer control system. Included in the information coded on the chip are acceptable application rates for the chemical. This is a very complex piece of equipment and, in the preferred embodiment, it still requires the operator to select the application rate using a manual push button control.

The present invention is concerned with an alternative form of application rate control.

SUMMARY

In accordance with the invention there is provided, for use with an agricultural sprayer comprising:
a vehicle for propelling the sprayer over the ground and having an operator's station;
spray booms transported by the vehicle and having spray nozzles thereon;
a water tank;
a water pump;
water lines delivering water from the water tank to the water pump and from the water pump to the nozzle;
a chemical supply;
a metering pump; and
chemical lines for delivering chemical from the chemical supply to the metering pump and from the metering pump to the water lines, control means for controlling operation of at least the metering pump, said control means comprising:
a key having information coded thereon in machine readable form, said information including at least a rate of chemical application;
visible indicia on the key reproducing information coded on the key, including at least a rate of the chemical application;
key decoding means for receiving and holding the key, for decoding the information code on the key and for generating signals representing the decoded information, the decoding means being mounted in the vehicle adjacent an operator's station for continuing observation by an operator, the key decoding means retaining the key with the visible indicia displayed for continuing observation of the indicia by the operator;
processor means responsive to said signals for controlling operation of at least the metering pump thereby controlling application and dilution parameters of the chemical.

Preferably, the decoding means include a source of light and a plurality of individual light detectors spaced from and confronting the source of light. The detectors are operatively connected to the processor. The key is removably insertable between the source of light and the detectors so that a pattern of apertures through the key allows illumination of a corresponding pattern of detectors, thus producing a coded signal for the processor.

A plurality of keys with different codings may be provided with the system or, alternatively, an individual coded key may be attached to the container of chemical when purchased and discarded once the chemical has been used up.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 2:
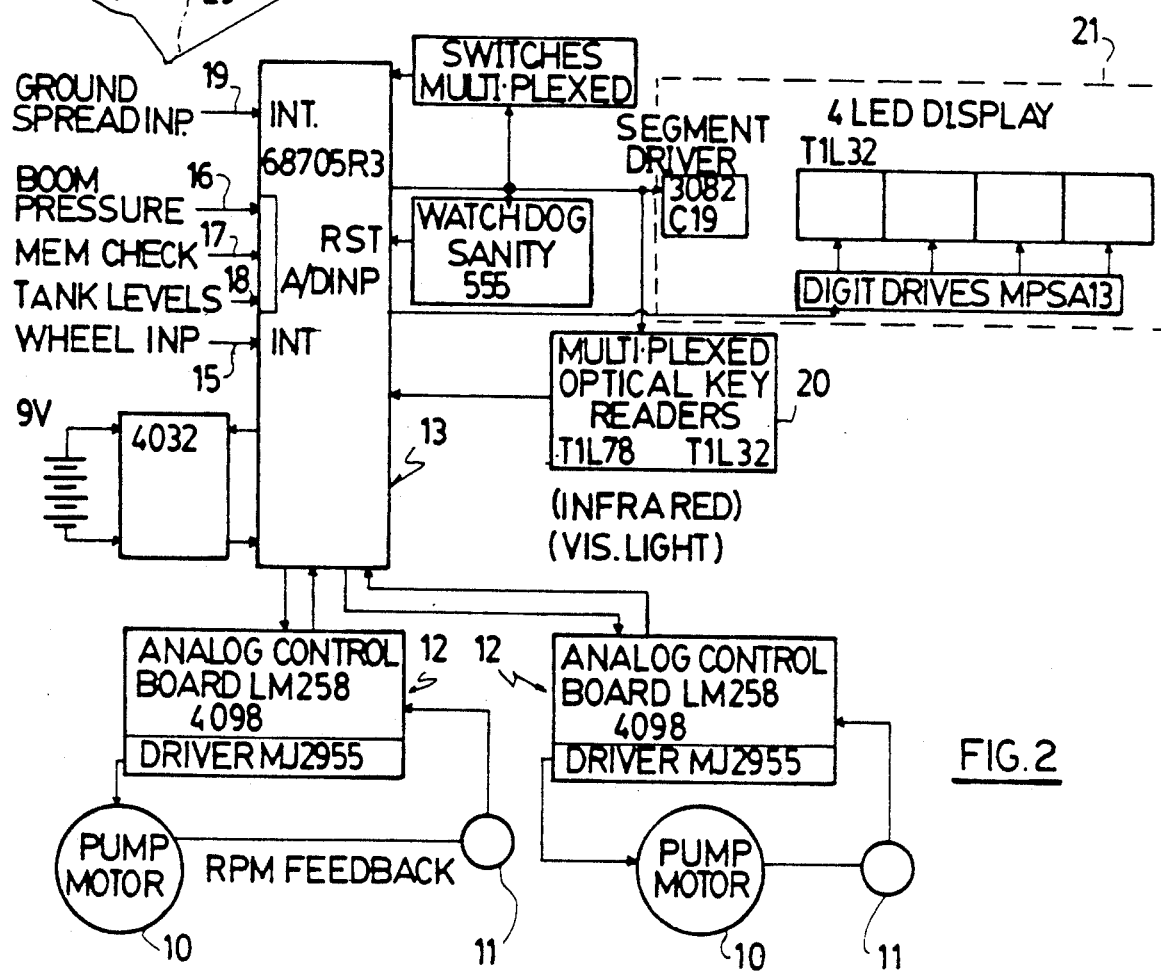
FIG. 2 is a block diagram of the invention including the optional LCD portion.

Referring first to FIG. 2, reference character 10 illustrates a pump motor having RPM feedbacks 11 to an analog control and drive assembly collectively designated 12 which in turn is operatively connected to a microprocessor collectively designated 13.

This microprocessor (68705R3) is operated by nine volt battery 14 and is provided with various inputs such as thumb wheel input 15, boom pressure input 16, reference memory check 17, tank levels 18, ground speed indicator 19 and the like.

It also has optical reader inputs TIL 78 and TIL 32 indicated schematically by reference character 20. It will be noted that there are two analog control and drivers 12 and two pump motor and feedback assemblies 10 and 11.

There is also an LCD option included within the dotted box 21 operatively connected to the microprocessor.

Figure 1:
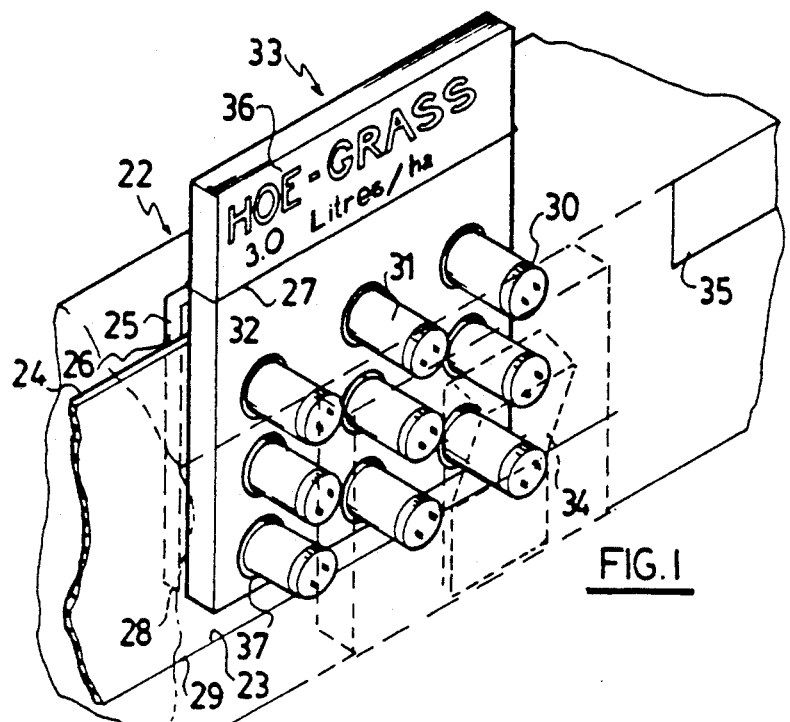
FIG. 1 is an isometric fragmentary partially schematic view of the control portion of the controller.

The optical readers 20 comprise the input from the controller shown schematically in FIG. 1 and collectively designated 22. This preferably forms part of a monitor assembly 40 situated within the cab 42 of the tractor or sprayer 44 (if self-propelled, see FIG. 7) and may include the aforementioned thumb wheel inputs 15 and LCD inputs 21.

The control means includes a circuit board 23 upon which is mounted on one side 24 thereof, a light source 25 with a dispersion reflector built therein.

The light source may take many forms which are conventional and the dispersion reflector insures that an approximately equal amount of light is available over the entire surface of the light source bounded by the sides 26, the upper side 27 and the base 28 thus forming a substantially rectangular enclosure Although the term "light source" is utilized, any convention electromagnetic radiation may be used such as infrared, magnetic, and the like.

Spaced and parallel from this light source and attached to the front side 29 of the circuit board, is a plurality of light (or electro-magnetic radiation) sensors collectively designated 30. These sensors are conventional and include directional shields 31 surrounding same and extending forwardly therefrom.

They may be mounted in a grid fashion and connected to a source of electro-magnetic power (not illustrated). These light sensors and the light source define a rectangular aperture 32 therebetween which is adapted to receive a key collectively designated 33, details of which will hereinafter be described. The circuit board is cut out or provided with apertures between the light source 25 and the sensors 30.

Also attached to the circuit board 23 is a main pump switch 34 operatively connected to the pump motors 10 and it is desired that a readout 35 also be provided on the circuit board adjacent the location of the light source and sensors hereinbefore described.

The aforementioned key 33 is preferably formed from a rigid synthetic plastic substantially rectangular in configuration although of course other configurations can be used depending upon the location and configuration of the aforementioned light source and detectors or sensors.

The key 23 includes an upper portion 36 upon which information may be provided together with identification. In the present instance, the name of the chemical is indicated together with the preferred rate of application. namely, 3.0 liters per hectare.

However, this information may be in Imperial measure such as gallons or pints per acre or what is known as "bastard" configuration such as liters per acre which is quite common.

The key may be provided with a plurality of apertures which match corresponding apertures in the circuit board and which are aligned with the individual light sensors 30.

In FIG. 1, nine such apertures are shown but any combination of apertures and blanks may be provided so that the combination of apertures and blanks accommodates all possible rates and any other commands which may be required such as informing the monitor that a key is in place, informing the monitor relative to the measuring units which apply, and the like.

The number of possible combinations is defined as 2 to the power of the number of holes. Therefore, for four holes or apertures, $2^4$ or 16 different combinations exist: for nine holes, $2^9$ or 512 different combinations exist.

The light source 25 either with a dispersion reflector or individual bulbs for each aperture is provided on one side of the key when inserted into the monitor and floods that side with light. The light sensors 30 are highly directional in order to avoid picking up stray light, and are positioned opposite each potential aperture. If a key is inserted and interrupts the beam of light indicating no aperture, the sensor will see no light and register this information. In this general manner, the individual key transmits its coded information to the monitor with no requirement from the operator short of putting the key into the monitor. The key can be formed so that it can only be inserted in one orientation thus preventing inadvertent incorrect insertion. (Not illustrated)

The location of the key relative to the pump switch 26 indicates to the operator the type of chemical and rate of injection by the pump activated by the switch confirmed by the information from the microprocessor 13 displayed on readout 35.

Figure 6:
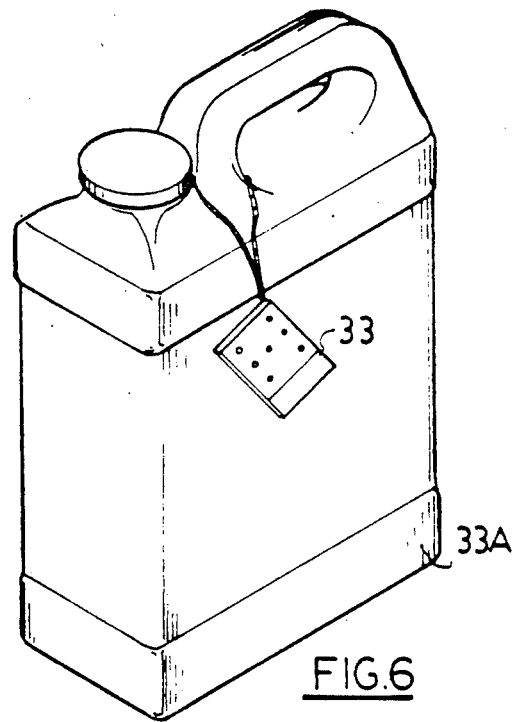
FIG. 6 is an isometric view of a chemical container with a control key attached thereto.

A set of keys may be supplied with the monitor with perhaps yearly updates being made available by the monitor manufacturer. However, it is believed that the ideal system is to have the key 33 supplied with the container 33A containing the chemical as shown in FIG. 6. Under these circumstances the operator merely inserts the key, sprays the fields and then discards the key upon finishing that particular supply of chemical.

It will be appreciated that a rate can be programmed into the monitor in the usual way (i.e. thumbwheel, pushbuttons or the like) in case of key loss or if a rate is desired which is not available in key code form.

However, use of the key which continually displays the desired rate and the display of "actual" rate at 35 will reduce many errors that would result in incorrect application.

Figure 3:
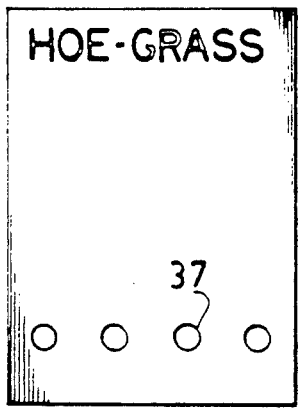
FIG. 3 is a front elevation of one of the keys.
Figure 4:
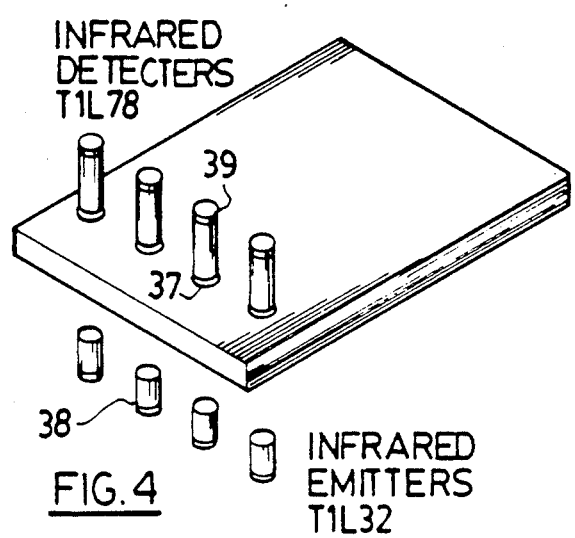
FIG. 4 is a partially schematic view of the key of FIG. 3 showing the infrared emitters and detectors.
Figure 5:
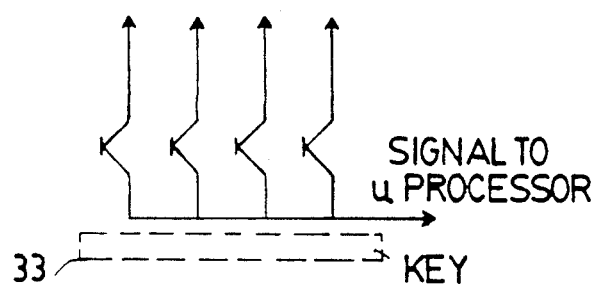
FIG. 5 is a schematic view showing the key assembly operation.

FIGS. 3 and 4 show key 33 diagrams with a lower row of four apertures 37 which may be used to indicate to the processor that a key has been inserted. These can be by infrared emitters 38 transmitting a signal to the micro processor by infrared detectors 39, but if the pump is switched on with no card inserted, then it may use the previously programmed rate. If, however, a new card is inserted, then the microprocessor checks the required rate from the software (not illustrated) and adjusts the pump to the correct requirements.

In operation, the motors 10 driving the pumps are preferably controlled only by the analogue portion 12. The microprocessor 13 just calculates the proper motor speed and then corrects the analogue controller 12.

Figure 7:
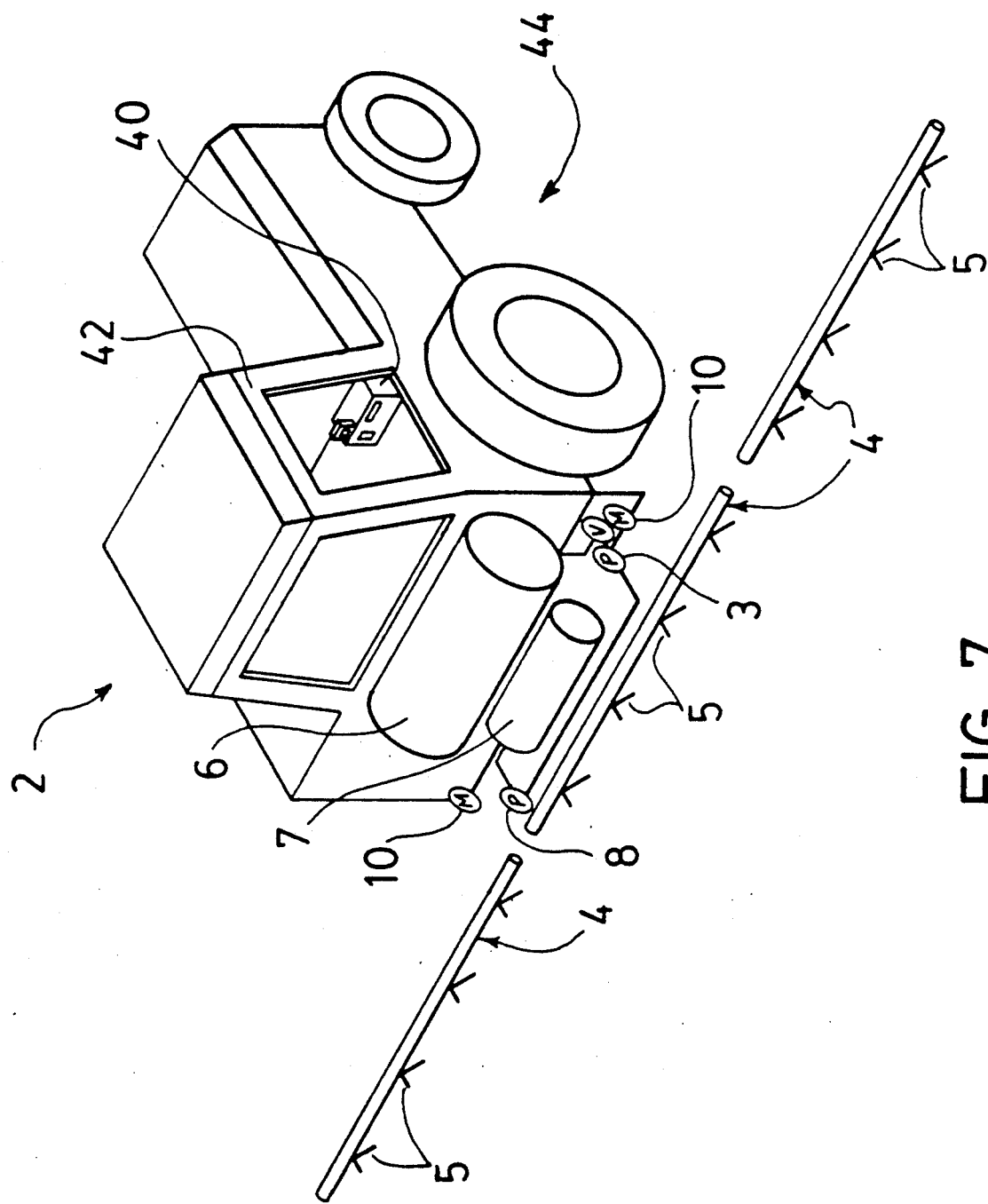
FIG. 7 is an isometric schematic view of an agricultural sprayer.

FIG. 7 illustrates an agricultural sprayer 2 including booms 4 with nozzles 5. A water tank 6 and a chemical container 7 are carried by the sprayer. Water is supplied from water tank 6 to the booms 4 using a water supply including a water pump 3 and a pump motor 10. The agricultural chemicals are injected into the water supply by a metering pump 8 driven by the other pump motor 10. The motors 10 are controlled by monitor 40 in the cab 42 of the tractor 44.

It will be appreciated that the detailed description above is only an example of how one could accomplish the idea of monitor user-friendliness illustrated herein. It should be realized that the device used to carry the coded information could be many varied shapes and configurations; the method used to detect the coded information could be one of many possibilities (magnetic, infrared, mechanical, etc.); and the method used to vary the pump speed based on the inputted coded information could be one of many possibilities (analogue, microprocessor, etc.).

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. For use with an agricultural sprayer comprising:
a vehicle for propelling the sprayer over the ground and having an operator's station;
spray booms transported by the vehicle and having spray nozzles thereon;
a water tank;
a water pump;
water lines delivering water from the water tank to the water pump and from the water pump to the nozzle;
a chemical supply;
a metering pump; and
chemical lines for delivering chemical from the chemical supply to the metering pump and from the metering pump to the water lines, control means for controlling operation of at least the metering pump, said control means comprising:
a key having information coded thereon in machine readable form, said information including at least a rate of chemical application;
visible indicia on the key reproducing information coded on the key, including a least the chemical application;
key decoding means for receiving and holding the key, for decoding the information code on the key and for generating signals representing the decoded information, the decoding means being mounted in the vehicle adjacent an operator's station for continuing observation by an operator, the key decoding means retaining the key with the visible indicia displayed for continuing observation of the indicia by the operator;
processor means responsive to said signals for controlling operation of at least the metering pump thereby controlling application and dilution parameters of the chemical.

2. Apparats according to claim 1, wherein said decoding means include a source of light and a plurality of individual light detectors spaced from and confronting said source of light so as to receive light therefrom, said detectors being operatively connected to said processor means, said key being removably insertable between said source of light and said detectors, and including a plurality of apertures arranged such that with the key means inserted in the decoding means, each aperture aligns between said source of light and a respective one of said detectors for producing a coded signal for said processor means.

3. Apparatus according to claim 2 which includes a source of infrared radiation adjacent said source of light and an infrared detector spaced from said source of infrared radiation to receive infrared radiation therefrom, said infrared detector being operatively connected to said processor means, said key shielding said source of infrared radiation from said infrared detector when said key is inserted in the decoding means, thereby indicating the presence of said key.

4. Apparatus according to claim 2 in which said source of light and said light detectors define a substantially rectangular recess therebetween, said key consisting of a planar, multi-apertured plate having contours similar to said rectangular recess and being insertable and removable therefrom.

5. Apparatus according to claim 1 which includes an analog control and driving means operatively connected between said processor means and said metering pump for operating said metering pump in accordance with signals from said processor means.

6. Apparatus according to claim 2 which includes an analog control and driving means operatively connected between said processor means and said metering for operating said metering pump in accordance with signals from said processor means.

7. Apparatus according to claim 3 which includes an analog control and driving means operatively connected between said processor means and said metering pump for operating said metering pump in accordance with signals from said processor means.

8. Apparatus according to claim 2 in which said source of light includes a dispersal reflector.

9. Apparatus according to claim 2 in which said light detectors each include directional shields.

10. Apparatus according to claim 8 in which said light detectors each include directional shields.

11. Apparatus according to claim 1 in which said key is coded with information to control the selection of measuring unit parameters, rate of application parameters, strength of solution parameters and absence or presence of said key, said key decoding means including a monitor having display means adjacent said key said display means being operatively connected to said processor means to display said parameters when said key is inserted and said metering pump is operating.

12. The device according to claim 2 in which said key is coded with information to control the selection of measuring unit parameters, rate of application parameters, strength of solution parameters and absence or presence of said key, said decoding means including a monitor having display means adjacent said display means being operatively connected to said processor means to display said parameters when said key is inserted and said metering pump switch is operating.

* * * * *